(No Model.)  2 Sheets—Sheet 1.
H. M. HORRNE.
VEHICLE WHEEL.
No. 339,180.  Patented Apr. 6, 1886.
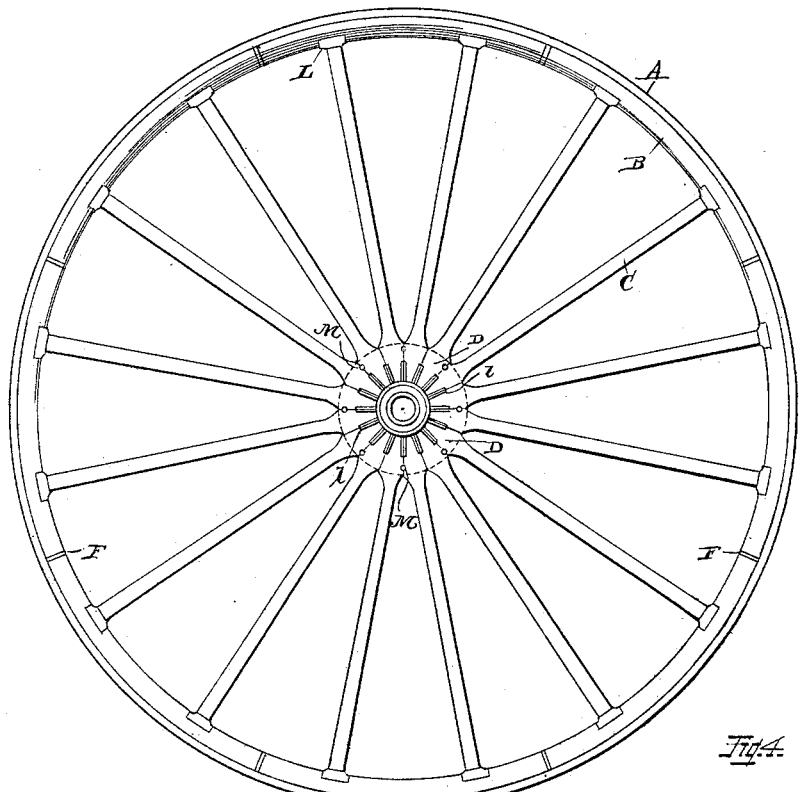
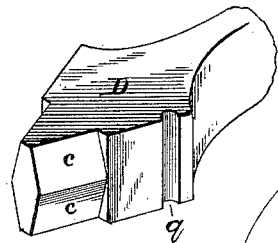
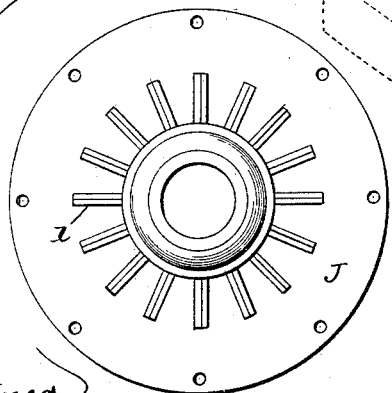
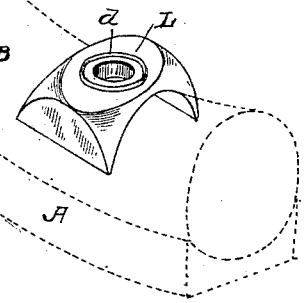
WITNESSES
W. W. Mortimer
E. J. Walkers
INVENTOR
Henry M. Horrne,
by R. G. Dyrenforth,
his Attorney

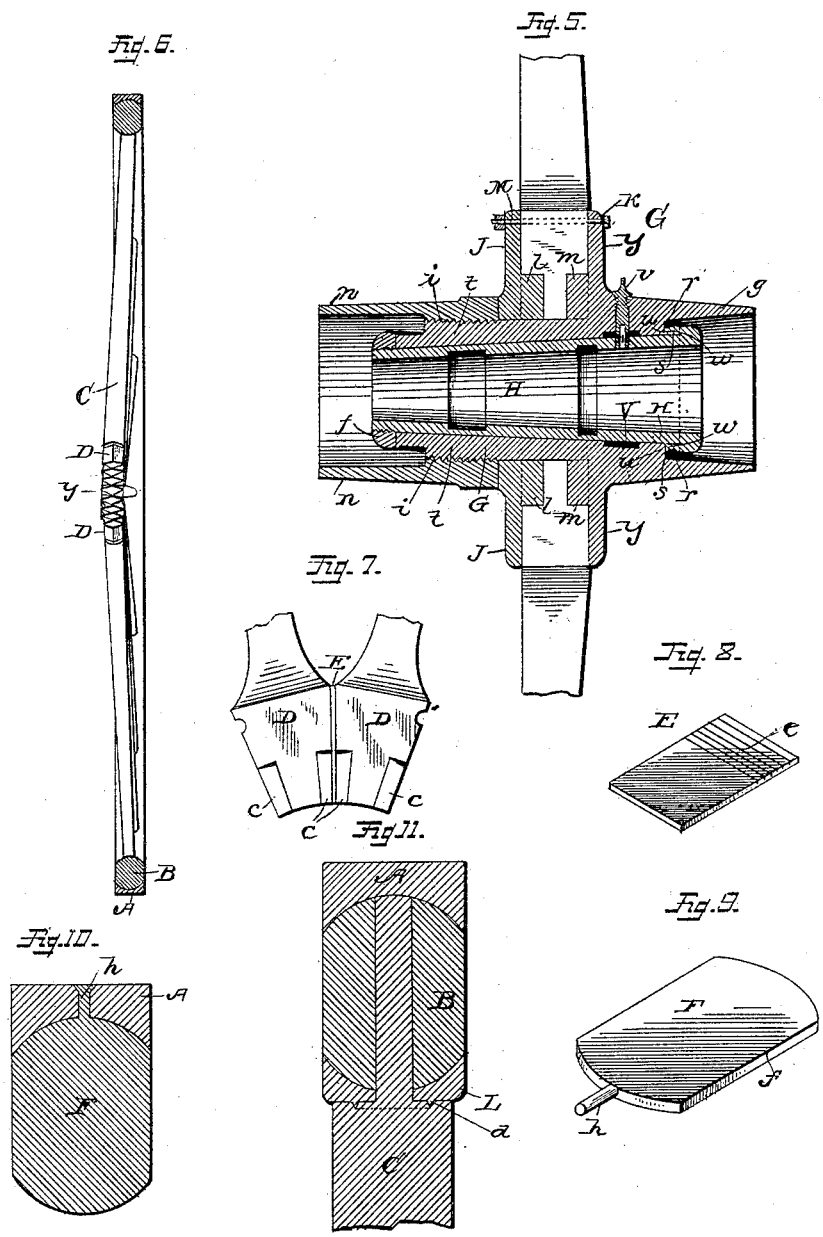

UNITED STATES PATENT OFFICE.

HENRY M. HORRNE, OF BLOSSOM PRAIRIE, ASSIGNOR OF ONE-FOURTH TO JOHN C. RUTHERFORD, OF DOWLIN, TEXAS.

VEHICLE-WHEEL.

SPECIFICATION forming part of Letters Patent No. 339,180, dated April 6, 1886.

Application filed May 12, 1885. Serial No. 165,205. (No model.)

*To all whom it may concern:*

Be it known that I, HENRY M. HORRNE, a citizen of the United States, residing at Blossom Prairie, in the county of Lamar and State of Texas, have invented certain new and useful Improvements in Wheels for Vehicles and other Purposes, of which the following is a specification, reference being had therein to the accompanying drawings.

My invention relates to wheels; and it consists in a novel construction of and mode of assembling or putting together the parts thereof, whereby I am enabled to produce a wheel which can be put together, taken apart, repaired, renewed, or tightened, with no tools or appliances other than a wrench, and by persons wholly unskilled in the manufacture of wheels in the ordinary way.

The construction involves a novel method of bracing the spokes upon or against each other at their inner ends, so that they mutually support each other and sustain the felly and tire without depending upon the hub or its box for support, in which respect I believe my wheel differs from all others. From this construction it follows that the hub and axle-box may be removed and applied at will without disturbing any other part of the wheel, and that when the hub is thus removed any other part of the wheel may be taken out and restored to position or replaced by another with ease and dispatch.

The peculiar manner of bracing and of assembling the parts can be applied also to other structures.

In the accompanying drawings, Figure 1 is a face view of my improved wheel with the outer disk removed; Fig. 2, an inner face view of one of the disks, showing the radial ribs thereon; Fig. 3, a perspective view of the hub end of one of the spokes; Fig. 4, a perspective view of the washer or plate applied to the end of the spoke and resting upon the felly, the felly and tire being shown in dotted lines; Fig. 5, a longitudinal central sectional view of the hub; Fig. 6, a view of the wheel previous to forcing the spokes into their final position; Fig. 7, a face view of the hub ends of spokes, showing the form thereof and the manner of placing them together and of applying filling-pieces in case of shrinkage; Fig. 8, a perspective view of one of the filling-pieces used between the hub ends of the spokes; Fig. 9, a perspective view of one of the filling-pieces employed between the felly-sections; Fig. 10, a section through one of said felly-pieces and the tire; Fig. 11, a transverse section through the tire, felly, and felly-plate, showing the end of the spoke, also in section.

Heretofore in the construction of wheels it has been customary to begin at the hub and build outward to the tire, applying the spokes to the hub and felly to the spokes, and, lastly, the tire to the felly, the tire being caused to bind all together, either by its shrinkage or by compression or "upsetting."

My plan is substantially a reversal of the foregoing, since I begin with a tire of the required dimensions, place the felly within the same and the spokes within the felly, press the spokes to position in such manner that they mutually force each other outward radially and press the felly firmly against the tire, and finally I apply the hub, which retains the parts all in place.

This mode of construction is applicable to wheels and pulleys of all kinds and for a great variety of uses, and it may also be applied to the building of other structures requiring to be braced from within.

I will first describe the construction of the parts, and then explain more in detail the manner of assembling the same or putting the wheel together.

A indicates a tire, of suitable dimensions, and either flat or concave on its interior, as preferred, a concave tire being represented in the drawings.

B indicates the felly, made up of several sections, as is usual, and C indicates the spokes.

In practice I find it convenient to make the felly-sections of a length to include two, or sometimes three, spokes, though they may be longer, if preferred. Each spoke has its inner end, D, make in the form of a keystone or blunt-ended wedge, as shown in Figs. 1, 3, and 7, and the inclined faces of said portion D are beveled each way from the middle, thereby producing the faces *c c*, Fig. 3. When the spokes are placed together, as in Figs. 1 and 7, these faces c c, coming together, form V-shaped mortises or recesses between the spokes or in the faces of the central portion of the wheel, as shown in said figures. These mortises or recesses occupy about one-half the length of the inner wedge-shaped end, D, of the spokes, as shown in Figs. 1, 3, and 7, leaving the wedge-faces intact beyond the same to form flat bearing or contact surfaces, by which the spokes may bear upon and mutually support each other.

The outer end of each spoke is tenoned in the usual way to enter the felly, the tenon being, however, made a trifle longer than in common wheels, in order that a bearing-plate or washer, L, may be inserted between the shoulder of the spoke and the felly, as indicated in Figs. 1 and 11. The form of this plate or washer is shown in Figs. 4 and 11, its outer face being shaped to conform accurately to the inner face of the felly, and its inner face being flat and perforated, as shown, to form a bearing for the end or shoulder of the spoke and to permit the spoke-tenon to pass through it. Encircling the opening is a raised V-shaped rib, d, projecting slightly above the flat bearing-face, and designed to embed itself in the shoulder of the spoke, as illustrated in Fig. 11. This prevents the plate from shifting about or wearing the tenon. The corners or faces of the plate or washer L are rounded or beveled, so that when the plates are applied to the felly the latter presents the appearance of being chamfered, though in reality having a smooth surface. These plates or washers L are not designed so much to act in the capacity of spoke-sockets as to afford means for compensation at any time for shrinkage or compression of the felly or spokes by removing plates or washers of one thickness and substituting thicker ones. This is an important feature of my wheel, owing to the fact that I depend upon bracing and tightening from the center outward, instead of binding and compressing from the periphery inward, and because, although I may, if deemed desirable, tighten the wheel by shrinking or compressing the tire, I contemplate and practice the reverse method under ordinary circumstances. Each spoke is formed with a semicircular groove, q, in one inclined face of the wedge-shaped portion D, the grooves being placed on opposite sides alternately of adjoining spokes, as shown in Figs. 1 and 7. This arrangement causes a circular opening to be made between each pair of spokes when the spokes are put together, yet avoids undue weakening or cutting away of the spokes, as would happen if both faces were grooved. The tire, felly, spokes, and plates or washers L being thus provided, the tire is placed upon a suitable support and the felly-sections are each supplied with their plates or washers and spokes. The felly-sections are then placed within the tire, and if a cold tire is employed, as is preferred, the felly-sections are made of a length slightly less than is required to closely fill the interior of the tire when pressed out firmly against the same. Each felly-section is inserted into the tire with its end close to the end of the next and with the spokes raised somewhat above the level of the tire, so that the central opening shall be enlarged and the space between the wedge-shaped ends D increased so that their faces may be readily placed together side by side. In this condition the spokes form a flattened cone-like structure with the center raised above the level of the tire, as indicated in Fig. 6. When in this shape, the hub is inserted, preparatory to forcing down the center of the cone into the proper plane for the finished wheel.

The form and construction of said hub will be understood upon referring to Figs. 2, 5, and 6. It consists, essentially, of three parts, the first indicated by the letter G and embracing a cylindrical or substantially-cylindrical body, t, having its outward or forward end threaded on the outside, as at i, a radial flange, K, about midway between its ends, and an enlarged inner end or sleeve, g, adapted to serve as an encircling band to the collar at the inner end of the axle-spindle. The body t is centrally bored from end to end, to receive the box or lining sleeve H, the portion g being bored out to a larger internal diameter than the remaining portion, thereby forming a shoulder, u, against which a corresponding shoulder, w, of the box H is drawn and held by a nut, f, applied to the threaded forward end of the box where the latter projects through and beyond the body t, as shown in Fig. 5.

In order to prevent the box or lining from turning within and independently of the hub, the shoulder of face u is formed with notches or recesses r, to receive lugs or projections s, formed on the face w of the box, or in the reverse order, as preferred. The outer face of the disk K is formed with radial ribs m, of V shape in cross-section, projecting outward from the face and extending radially from the cylindrical body t about half-way to the periphery of the disk. These ribs have the same inclination or bevel as the faces c of the spokes C, and are designed to enter between and bear against said faces, firmly bind and hold the inner ends of the spokes, and to afford means of compensation for any slight shrinkage that may occur in this portion of the spokes.

The second part of the hub is merely an annular disk, J, of the same size as disk K, and provided with corresponding ribs, l, which stand in line with the ribs m of disk K, and with them complete the seats or sockets for the inner ends of the spokes. The central opening of the disk J is of such size as to permit the disk to be slipped freely upon the cylindrical body t and moved up against the face of the central portion of the wheel formed by the spokes after the spokes are pressed into their proper position.

The third and remaining portion of the hub is the outer hub-band, which in the present instance is made in the form of a large nut, n, to screw upon the threaded portion $i$ of body $t$. This band serves not only to cover and protect the nut by which the wheel is held upon its spindle, but also acts, by reason of its nut form, to force the disk J firmly up against the outer face of the wheel, at the same time drawing disk K firmly against the inner face thereof, and crowding the ribs $l$ and $m$ into the spaces between the beveled faces $c$. Within the cylindrical body $t$ I form an annular groove, V, which, when the box or lining H is inserted, constitutes an oil receptacle or chamber. The oil from this chamber reaches the interior of the box or lining through a pin or stem, $v$, the inner end of which is made of tubular form and laterally pierced with one or more holes, through which oil may pass from space V to the interior of the stem and thence to the spindle or interior of the box. The pin or stem $v$ serves to close the filling-opening formed in the body of the hub, and also affords an easy means of controlling the discharge of oil or the supply to the spindle, the stem being made long enough, and the lateral hole or holes being so located that by screwing the stem slightly up or down the hole or holes shall be uncovered or covered more or less as required.

The interior of the box or lining H is provided with two annular grooves, in which the oil collects, and from which it is distributed over the spindle, said spindle and box tapering sufficiently to cause the flow or travel of oil toward the outer end.

The hub being thus constructed, the body $t$ of portion G is passed through the circular opening formed by the meeting of the portions D of the inner ends of the spokes, and the ribs $m$ are inserted between the faces $c$, it being understood, of course, that in the present instance the inner ends of the spokes are raised at the center at the inner face of the wheel, from which face or side the hub portion G is inserted. Suitable pressure is then applied to the end of the hub-section G, and the disk K, bearing equally upon all the spokes, causes them to move together into a common plane, approximating more or less closely to that of the tire and felly, according to the "dish" or absence thereof desired.

When the spokes are forced into position in the manner stated, the wedge-shaped portions D, bearing upon one another, form a complete circular or continuous arch, and any pressure from the exterior only tends to close the joints of the arch and render it more solid and perfect. It therefore follows that if the faces of the spokes are raised in the cone-like form explained, they will be pressed together with great force when the spokes are forced into an approximately-level plane, and act in the manner of a toggle-lever, as they do, with a constantly-increasing leverage. It also follows that the spokes abutting against and supporting each other at the central portion of the wheel and unable to move farther inward must exert a powerful outward pressure, and force the felly-sections against the tire with great power, thus tightening the wheel throughout, and without any dependence upon the hub for support against radial pressure inward. The hub is so proportioned that after the spokes are thus brought to position the hub may be readily removed, and when this is done the wheel will remain firm and rigid and resist immense pressure in the plane of its spokes. In putting the wheel together, however, the portion G of the hub is allowed to remain in position, and it may be made to fit so closely within the central opening of the wheel as to form an additional support for the spokes. The disk J is next applied to the outer face of the wheel, and then the nut $n$ is screwed upon the threaded portion $i$, binding the parts firmly together. The disks K and J are further drawn and held together by the bolts M, which pass through holes therein and through the holes formed by the semicircular grooves $q$ of the spokes C. When thus united and bound together, the wheel is extremely rigid and strong, and play or movement of the spokes is impossible.

Owing to the outward pressure upon the felly, small gaps or openings will appear between the ends of the adjoining sections. To close these and prevent the least end-play of the felly-sections, I employ between the sections thin metal spacing-plates F having an outline exactly conforming to the cross-section of the felly and formed with a tang or stem which passes through a hole drilled in the tire, and is headed down in the counterbored outer face of said hole, as shown in Fig. 10. These plates serve to hold the felly-sections firmly and accurately in place.

In the event of the wood of the spokes shrinking, as it is liable to do after long use or in continued dry weather, I remove the hub and insert between the ends D of the spokes one or more thin filling-pieces, E, of wood or other suitable material, scored or roughened at the inner end, as shown in Fig. 8, to prevent slipping from place. Thus with the filling-pieces E and the bearing-plates L, I am enabled to compensate for all the shrinkage and compression that can occur in a wheel in any manner.

It will be seen that this wheel may be put together and taken apart at any time and place with only a wrench to loosen the nuts and by any one possessing the slightest knowledge of mechanical matters.

The invention is applicable to any and all kinds of wheels and pulleys, though represented in the form of a carriage-wheel.

The parts can be made to given scales and interchangeable, and can be shipped in a "knockdown" shape to any place desired, thus requiring little room and reducing the cost of transportation and storage, and being kept in stock any part can be readily supplied and put in place without further preparation. The importance and great practical advantages of such a construction will be apparent.

It will be observed that the ends of box H project beyond the main body of the hub, (though, of course, not beyond the hub-bands,) and thus serve to take all wear and strain off the hub, including the thrust or end-play and the wear against the spindle, collar, and nut.

I am aware that it has been proposed to force the spokes of a wheel radially outward for the purpose of tightening the felly by forcing a conical sleeve or hub-body into the circle formed by the inner ends of the spokes; and I am likewise aware that it has been proposed to give the required tension to the spokes and felly by first seating the inner ends of the spokes in sockets in a two-part hub with their ends bearing upon the body of the hub or its box, then pressing the hub toward the plane of the felly and tire, and finally tightening the nuts and drawing the two parts of the hub together. These I disclaim.

My spokes are not driven outward at the center, but mutually support and sustain each other against radial pressure wholly independent of the hub or of any other central support. The inner ends of the spokes need not touch or bear upon the box or cylindrical portion of the hub, and no ribs, blades, or other parts extend between the inner ends of the spokes from flange to flange of the hub, but the spokes bear upon each other throughout the whole length of their wedge-shaped inner ends.

I am also aware that a wedge-block has been interposed between the ends of the felly-sections and made fast to the tire by a tire-bolt. This I do not claim.

Having thus described my invention, what I claim is—

1. The herein-described method of constructing a wheel, which method consists in first placing the tire on a suitable support, next inserting the spokes into the felly-sections, and placing said sections against the inner face of the tire with the inner ends of the spokes raised above the plane of the tire and felly, and placed side by side in a circle in immediate contact with one another, next pressing the raised central portion of the wheel down to the required plane, and, lastly, applying the hub to the inner ends of the spokes and thereby binding them firmly together, as set forth.

2. In the process of constructing wheels, the method of tightening the felly and spokes, which consists in placing the felly-sections against the interior of the tire with the outer ends of the spokes inserted in the felly-sections and their inner ends placed side by side and in immediate contact with one another in a plane above the plane of the tire and felly, and then forcing the inner ends of the spokes simultaneously and equally toward the plane of the tire and felly, whereby the outward pressure is effected by the spokes wholly independent of the hub.

3. A wheel provided with a removable hub and removable spokes, and a removable bearing plate or washer interposed between the shoulder of the spoke and the felly, whereby the spokes and felly may be made tight at any time by removing the plate or washer and substituting a thicker one.

4. In a wheel, the combination, with the felly and spokes, of bearing plates or washers interposed between the felly and spoke-shoulder and provided with a raised rib to embed itself in said shoulder, substantially as described and shown.

5. In a wheel, the combination of a tire having a concave inner face, a sectional felly having its outer face made to conform to the inner face of the tire, spokes having their outer ends seated in mortises in the felly-sections and their inner ends bearing against each other side by side, and a divided hub clamping the inner ends of the spokes, substantially as described and shown.

6. In a wheel, the combination of tire, felly, and spokes, and a hub consisting of part G, having disk K with radial ribs $m$, body $t$, provided with threaded portion $i$, sleeve $g$, and notches $r$, disk J, provided with ribs $l$, nut $n$, box H, provided with lugs $s$ and nut $f$, applied to the end of the box and serving to retain the same in place, substantially as set forth.

7. The combination, in a wheel, of a tire, a felly, a series of spokes having their corners cut away to form bevel-faces $d\ e$ at their inner ends, disks J K, provided with V-shaped ribs projecting from their faces to enter between the bevel-faces $d\ e$, and bolts for drawing the disks together, said disks being adapted to move to and from each other without turning.

In testimony whereof I affix my signature in presence of two witnesses.

HENRY M. HORRNE.

Witnesses:
R. G. DYRENFORTH,
GEORGE GOERNER.